US008352259B2

(12) United States Patent
Bogdanov

(10) Patent No.: US 8,352,259 B2
(45) Date of Patent: Jan. 8, 2013

(54) METHODS AND APPARATUS FOR AUDIO RECOGNITION

(75) Inventor: Vladimir Askold Bogdanov, Minneapolis, MN (US)

(73) Assignee: Rovi Technologies Corporation, Santa Clara, CA (US)

( * ) Notice: Subject to any disclaimer, the term of this patent is extended or adjusted under 35 U.S.C. 154(b) by 394 days.

(21) Appl. No.: 12/488,518

(22) Filed: Jun. 20, 2009

(65) Prior Publication Data

US 2009/0259690 A1 Oct. 15, 2009

Related U.S. Application Data

(63) Continuation of application No. 10/905,362, filed on Dec. 30, 2004, now Pat. No. 7,567,899.

(51) Int. Cl.
*G10L 15/00* (2006.01)

(52) U.S. Cl. .......... 704/231

(58) Field of Classification Search .......... 704/231, 704/273, 274

See application file for complete search history.

(56) References Cited

U.S. PATENT DOCUMENTS

| | | | | |
|---|---|---|---|---|
| 3,663,885 | A | 5/1972 | Stewart | 328/140 |
| 4,677,466 | A | 6/1987 | Lert et al. | 358/84 |
| 4,843,562 | A | 6/1989 | Kenyon et al. | 364/487 |
| 5,210,820 | A | 5/1993 | Kenyon | 395/2 |
| 5,432,852 | A | 7/1995 | Leighton et al. | 380/30 |
| 5,437,050 | A | 7/1995 | Lamb et al. | 455/2 |
| 5,473,759 | A | 12/1995 | Slaney et al. | 395/2.75 |
| 5,612,729 | A | 3/1997 | Ellis et al. | 348/2 |
| 5,647,058 | A | 7/1997 | Agrawal et al. | 395/601 |
| 5,825,830 | A | 10/1998 | Kopf | 375/340 |
| 5,862,260 | A | 1/1999 | Rhoads | 382/232 |
| 5,918,223 | A | 6/1999 | Blum et al. | 707/1 |
| 5,960,388 | A | 9/1999 | Nishiguchi et al. | 704/208 |
| 5,987,525 | A | 11/1999 | Roberts et al. | 709/248 |
| 6,061,680 | A | 5/2000 | Scherf et al. | 707/3 |
| 6,154,773 | A | 11/2000 | Roberts et al. | 709/219 |
| 6,161,132 | A | 12/2000 | Roberts et al. | 709/219 |
| 6,201,176 | B1 | 3/2001 | Yourlo | 84/609 |
| 6,230,192 | B1 | 5/2001 | Roberts et al. | 709/217 |
| 6,230,207 | B1 | 5/2001 | Roberts et al. | 709/236 |
| 6,240,459 | B1 | 5/2001 | Roberts et al. | 709/232 |
| 6,304,523 | B1 | 10/2001 | Jones et al. | 369/30 |

(Continued)

FOREIGN PATENT DOCUMENTS

WO 99/30488 6/1999

(Continued)

OTHER PUBLICATIONS

Tzanetaski, G., "Multifeature Audio Segmentation for Browing and Annotation", pp. W99-1-W99-4; Proc. 1999 IEEE Workshop on Applications of Signal Processing to Audio and Acoustics, New Paltz, New York, Oct. 17-20, 1999.

(Continued)

*Primary Examiner* — Michael N Opsasnick
(74) *Attorney, Agent, or Firm* — Schwegman Lundberg & Woessner, P.A.

(57) ABSTRACT

Frequencies from a set of audio source files are extracted and measured across the set to determine a range of each of the frequencies. Stable frequencies of the frequencies are detected based on each range and used to create a stable frequency family. An unknown recording is mapped to the stable frequency family to form an audio fingerprint.

20 Claims, 6 Drawing Sheets

U.S. PATENT DOCUMENTS

| | | | | |
|---|---|---|---|---|
| 6,321,200 | B1 | 11/2001 | Casey | 704/500 |
| 6,330,593 | B1 | 12/2001 | Roberts et al. | 709/217 |
| 6,434,520 | B1 | 8/2002 | Kanevsky et al. | 704/243 |
| 6,453,252 | B1 | 9/2002 | Laroche | 702/75 |
| 6,463,433 | B1 | 10/2002 | Baclawski | 707/5 |
| 6,505,160 | B1 | 1/2003 | Levy et al. | 704/270 |
| 6,512,796 | B1 | 1/2003 | Sherwood | 374/242 |
| 6,539,395 | B1 | 3/2003 | Gjerdingen et al. | 707/102 |
| 6,570,991 | B1 | 5/2003 | Scheirer et al. | 381/110 |
| 6,571,144 | B1 | 5/2003 | Moses et al. | 700/94 |
| 6,574,594 | B2 | 6/2003 | Pitman et al. | 704/236 |
| 6,604,072 | B2 | 8/2003 | Pitman et al. | 704/231 |
| 6,657,117 | B2 | 12/2003 | Weare et al. | 84/668 |
| 6,675,174 | B1 | 1/2004 | Bolle et al. | 707/104.1 |
| 6,826,350 | B1 | 11/2004 | Kashino et al. | 386/46 |
| 6,829,368 | B2 | 12/2004 | Meyer et al. | 382/100 |
| 6,963,975 | B1 | 11/2005 | Weare | 713/176 |
| 7,451,078 | B2 | 11/2008 | Bogdanov | 704/273 |
| 2002/0023020 | A1 | 2/2002 | Kenyon et al. | 705/26 |
| 2002/0028000 | A1 | 3/2002 | Conwell et al. | 382/100 |
| 2002/0055920 | A1 | 5/2002 | Fanning et al. | 707/3 |
| 2002/0087565 | A1 | 7/2002 | Hoekman et al. | 707/100 |
| 2002/0101989 | A1 | 8/2002 | Markandey et al. | 380/210 |
| 2002/0133499 | A1 | 9/2002 | Ward et al. | 707/102 |
| 2003/0018709 | A1 | 1/2003 | Schrempp et al. | 709/203 |
| 2003/0028796 | A1 | 2/2003 | Roberts et al. | 713/193 |
| 2003/0033321 | A1 | 2/2003 | Schrempp et al. | 707/104.1 |
| 2003/0046283 | A1 | 3/2003 | Roberts | 707/6 |
| 2003/0086341 | A1 * | 5/2003 | Wells et al. | 369/13.56 |
| 2003/0101162 | A1 | 5/2003 | Thompson et al. | 707/1 |
| 2003/0135513 | A1 | 7/2003 | Quinn et al. | 707/102 |
| 2003/0174861 | A1 | 9/2003 | Levy et al. | 382/100 |
| 2003/0191764 | A1 | 10/2003 | Richards | 707/100 |
| 2004/0028281 | A1 | 2/2004 | Cheng et al. | 382/232 |
| 2004/0034441 | A1 | 2/2004 | Eaton et al. | 700/94 |
| 2004/0074378 | A1 | 4/2004 | Allamanche et al. | 84/616 |
| 2004/0143349 | A1 | 7/2004 | Roberts et al. | 700/94 |
| 2004/0172411 | A1 | 9/2004 | Herre et al. | 707/104.1 |
| 2004/0267522 | A1 | 12/2004 | Allamanche et al. | 704/205 |
| 2005/0017879 | A1 | 1/2005 | Linzmeier et al. | 341/50 |
| 2005/0065976 | A1 | 3/2005 | Holm et al. | 707/104.1 |
| 2005/0141707 | A1 | 6/2005 | Haitsma et al. | 380/201 |
| 2005/0197724 | A1 | 9/2005 | Neogi | 700/94 |
| 2006/0122839 | A1 | 6/2006 | Wang et al. | 704/273 |
| 2006/0190450 | A1 | 8/2006 | Holm et al. | 707/6 |
| 2006/0229878 | A1 | 10/2006 | Scheirer | 704/273 |

FOREIGN PATENT DOCUMENTS

| | | |
|---|---|---|
| WO | 01/20483 | 3/2001 |
| WO | 01/37465 | 5/2001 |
| WO | 02/065782 | 8/2002 |
| WO | 02/077966 | 10/2002 |
| WO | 02/093823 | 11/2002 |
| WO | 03/067466 | 8/2003 |
| WO | 03/096337 | 11/2003 |
| WO | 2004/044820 | 5/2004 |
| WO | 2004/077430 | 9/2004 |
| WO | 2004/081817 | 9/2004 |

OTHER PUBLICATIONS

R. Venkatesan, S.M. Koon, M.H. Jakubowski and P. Moulin, "Robust Image Hashing" , ICIP'00-IEEE International Conference on Image Processing, Vancouver, Sep. 10-13, 2000.

Chun-Shien Lu "Audio Fingerprinting Based on Analyzing Time-Frequency Localization of Signals", IEEE, pp. 174-177 (2002).

Haitsma, J., et al., "A Highly Robust Audio Fingerprinting System", ISMIR 2002, 3rd Int'l Conference on Music Information Retrieval, IRCAM-Centre Pompidou, Paris, France, Oct. 13-17, 2002, pp. 1-9.

International Search Report and Written Opinion of the International Searching Authority, PCT/US2005/46096, Jul. 16, 2008.

Haitsma, J., et al., "Robust Audio Hashing for Content Identification," in Proceedings of the Content-Based Multimedia Index, Italy (Sep. 2001).

Haitsma, J., et al., "An Efficient Database Search Strategy for Audio Fingerprinting ", in Proceedings of the 2003 IEEE Radar Conference, Dec. 9, 2002, pp. 178-181.

* cited by examiner

METHODS AND APPARATUS FOR AUDIO RECOGNITION

CROSS REFERENCE TO RELATED APPLICATION

This application is a continuation of U.S. application Ser. No. 10/905,362, filed Dec. 30, 2004, now U.S. Pat. No. 7,567, 899, the disclosure of which is incorporated herein by reference in its entirety.

FIELD OF THE INVENTION

The present invention relates generally to delivering supplemental content stored on a database to a user (e.g., supplemental entertainment content relating to an audio recording), and more particularly to recognizing an audio recording fingerprint retrieving the supplemental content stored on the database.

BACKGROUND OF THE INVENTION

Recordings can be identified by physically encoding the recording or the media storing one or more recordings, or by analyzing the recording itself. Physical encoding techniques include encoding a recording with a "watermark" or encoding the media storing one or more audio recordings with a TOC (Table of Contents). The watermark or TOC may be extracted during playback and transmitted to a remote database which then matches it to supplemental content to be retrieved. Supplemental content may be, for example, metadata, which is generally understood to mean data that describes other data. In the context of the present invention, metadata may be data that describes the contents of a digital audio compact disc recording. Such metadata may include, for example, artist information (name, birth date, discography, etc.), album information (title, review, track listing, sound samples, etc.), and relational information (e.g., similar artists and albums), and other types of supplemental information such as advertisements and related images.

With respect to recording analysis, various methods have been proposed. Generally, conventional techniques analyze a recording (or portions of recordings) to extract its "fingerprint," that is a number derived from a digital audio signal that serves as a unique identifier of that signal. U.S. Pat. No. 6,453,252 purports to provide a system that generates an audio fingerprint based on the energy content in frequency subbands. U.S. Pat. No. 7,110,338 purports to provide a system that utilizes invariant features to generate fingerprints.

Storage space for storing libraries of fingerprints is required for any system utilizing fingerprint technology to provide metadata. Naturally, larger fingerprints require more storage capacity. Larger fingerprints also require more time to create, more time to recognize, and use up more processing power to generate and analyze than do smaller fingerprints.

What is needed is a fingerprinting technology which creates smaller fingerprints, uses less storage space and processing power, is easily scalable and requires relatively little hardware to operate. There also is a need for technology that will enable the management of hundreds or thousands of audio files contained on consumer electronics devices at home, in the car, in portable devices, and the like, which is compact and able to recognize a vast library of music.

SUMMARY OF THE INVENTION

It is an object of the present invention to provide a fingerprinting technology which creates smaller fingerprints, uses less storage space and processing power, is easily scalable and requires relatively little hardware to operate.

It is also an object of the present invention to provide a fingerprint library that will enable the management of hundreds or thousands of audio files contained on consumer electronics devices at home, in the car, in portable devices, and the like, which is compact and able to recognize a vast library of music.

In accordance with one embodiment of the present invention an apparatus for recognizing an audio fingerprint of an unknown audio recording is provided. The apparatus includes a database operable to store audio recording identifiers corresponding to known audio recordings, where the audio recording identifiers are organized by variation information about the audio recordings. A processor can search a database and identify at least one of the audio recording identifiers corresponding to the audio fingerprint, where the audio fingerprint includes variation information of the unknown audio recording.

In accordance with another embodiment of the present invention a method for recognizing an audio fingerprint of an unknown audio recording is provided. The method includes organizing audio recording identifiers corresponding to known audio recordings by variation information about the audio recordings, and identifying at least one of the audio recording identifiers corresponding to the audio fingerprint, where the audio fingerprint includes variation information of the unknown audio recording.

In accordance with yet another embodiment of the present invention computer-readable medium containing code recognizing an audio fingerprint of an unknown audio recording is provided. The computer-readable medium includes code for organizing audio recording identifiers corresponding to known audio recordings by variation information about the audio recordings, and identifying at least one of the audio recording identifiers corresponding to the audio fingerprint, where the audio fingerprint includes variation information of the unknown audio recording.

DETAILED DESCRIPTION OF THE INVENTION

Figure 1:
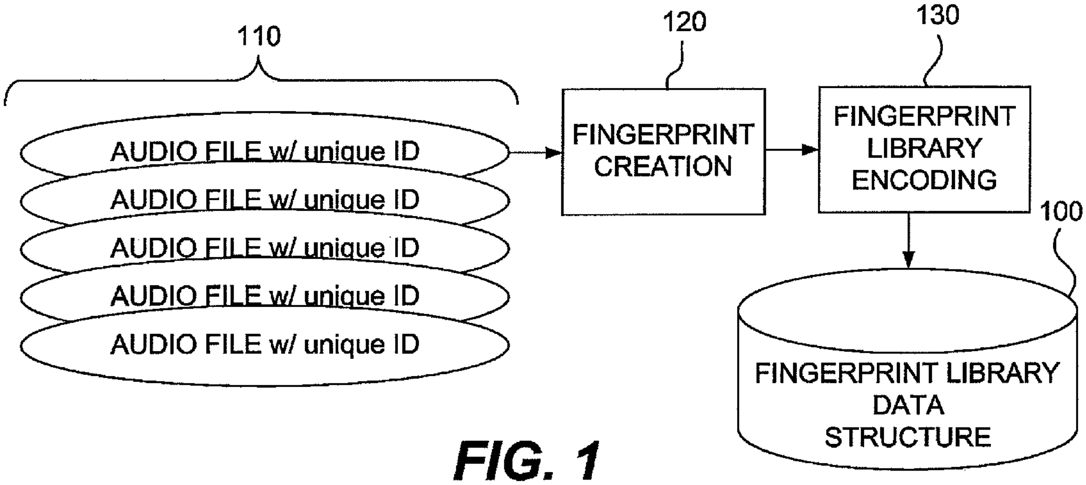
FIG. 1 illustrates a system for creating a fingerprint library data structure on a server.

As used herein, the term "computer" (also referred to as "processor") may refer to a single computer or to a system of interacting computers. Generally speaking, a computer is a combination of a hardware system, a software operating system and perhaps one or more software application programs. Examples of computers include, without limitation, IBM-type personal computers (PCs) having an operating system such as DOS, Microsoft Windows, OS/2 or Linux; Apple computers having an operating system such as MAC-OS; hardware having a JAVA-OS operating system; graphical work stations, such as Sun Microsystems and Silicon Graphics Workstations having a UNIX operating system; and other devices such as for example media players (e.g., iPods, PalmPilots, Pocket PCs, and mobile telephones).

For the present invention, a software application could be written in substantially any suitable programming language, which could easily be selected by one of ordinary skill in the art. The programming language chosen should be compatible with the computer by which the software application is executed, and in particular with the operating system of that computer. Examples of suitable programming languages include, but are not limited to, Object Pascal, C, C++, CGI, Java and Java Scripts. Furthermore, the functions of the present invention, when described as a series of steps for a method, could be implemented as a series of software instructions for being operated by a data processor, such that the present invention could be implemented as software, firmware or hardware, or a combination thereof.

The present invention uses audio fingerprints to identify audio files encoded in a variety of formats (e.g., WMA, MP3, WAV, and RM) and which have been recorded on different types of physical media (e.g., DVDs, CDs, LPs, cassette tapes, memory, and hard drives). Once fingerprinted, a retrieval engine may be utilized to match supplemental content to the fingerprints. A computer accessing the recording displays the supplemental content.

The present invention can be implemented in both server-based and client or device-embedded environments. Before the fingerprint algorithm is implemented, the frequency families that exhibit the highest degree of resistance to the compression and/or decompression algorithms ("CODECs") and transformations (such frequency families are also referred to as "stable frequencies") are determined. This determination is made by analyzing a representative set of audio recording files (e.g., several hundred audio files from different genres and styles of music) encoded in common CODECs (e.g., WMA, MP3, WAV, and RM) and different bit rates or processed with other common audio editing software.

The most stable frequency families are determined by analyzing each frequency and its harmonics across the representative set of audio files. First, the range between different renderings for each frequency is measured. The smaller the range, the more stable the frequency. For example, a source file (e.g., one song), is encoded in various formats (e.g., MP3 at 32 kbs, 64 kbs, 128 kbs, etc., WMA at 32 kbs, 64 kbs, 128 kbs, etc.). Ideally, the difference between each rendering would be identical. However, this is not typically the case since compression distorts audio recordings.

Only certain frequencies will be less sensitive to the different renderings. For example, it may be the case that 7 kHz is 20 dB different between a version of MP3 and a version of WMA, and another frequency, e.g., 8 kHz, is just 10 dB different. In this example, 8 kHz is the more stable frequency. The measurement used to determine the difference can be any common measure of variation such as standard or maximum deviations. Variation in the context of the present invention is a measure of the change in data, a variable, or a function.

As CODECs are changed and updated, this step might need to be performed again. Typically stable frequencies are determined on a server.

The stable frequencies are extracted from the representative set of audio recording files and collected into a table. The table is then stored onto a client device which compares the stable frequencies to the audio recording being fingerprinted. Frequency families are harmonically related frequencies that are inclusive of all the harmonics of any of its member frequencies and as such can be derived from any member frequency taken as a base frequency. Thus, it is not required to store in the table all of the harmonically related stable frequencies or the core frequency of a family of frequencies.

The client maps the elements of the table to the unknown recording in real time. Thus, as a recording is accessed, it is compared to the table for a match. It is not required to read the entire media (e.g., an entire CD) or the entire audio recording to generate a fingerprint. A fingerprint can be generated on the client based only on a portion of the unknown audio recording.

The present invention will now be described in more detail with reference to FIGS. 1-8.

The evaluation of frequency families described below is performed completely in integer math without using frequency domain transformation methods (e.g., Fast Fourier Transform or FFT).

FIG. 1 illustrates a system for creating a fingerprint library data structure 100 on a server. The data structure 100 is used as a reference for the recognition of unknown audio content and is created prior to receiving a fingerprint of an unknown audio file from a client. All of the available audio recordings 110 on the server are assigned unique identifiers (or IDs) and processed by a fingerprint creation module 120 to create corresponding fingerprints. The fingerprint creation module 120 is the same for both creating the reference library and recognizing the unknown audio.

Once the fingerprint creation has been completed, all of the fingerprints are analyzed and encoded into the data structure by a fingerprint encoder 130. The data structure includes a set of fingerprints organized into groups related by some criteria (also referred to as "feature groups," "summary factors," or simply "features") which are designed to optimize fingerprint access.

Figure 2:
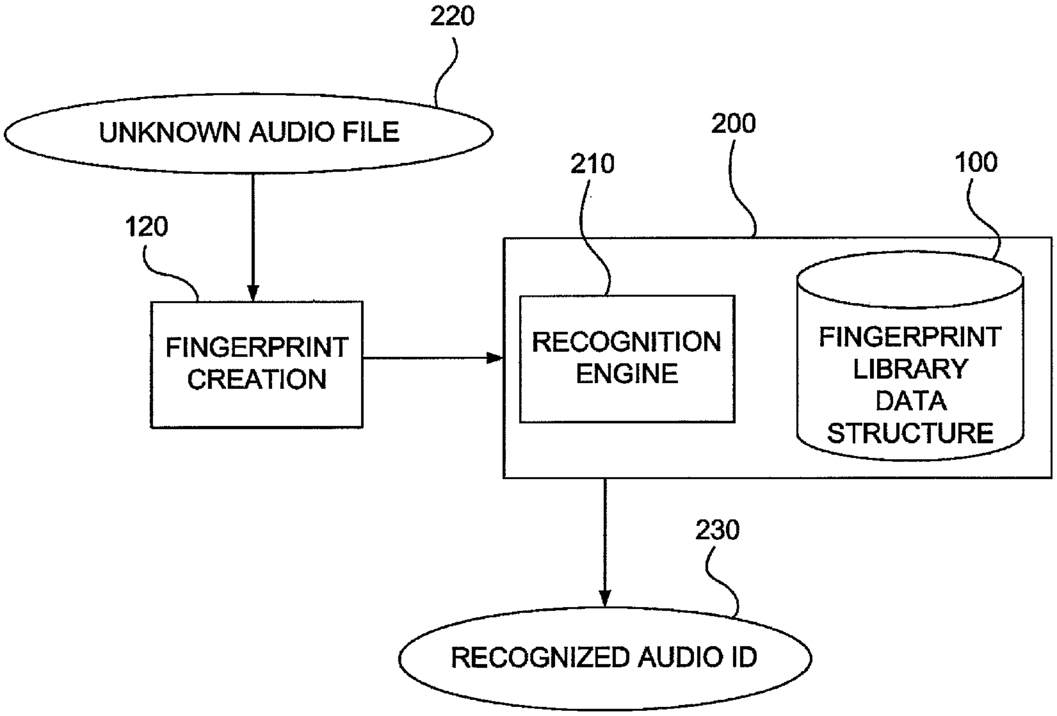
FIG. 2 illustrates a system for creating a fingerprint from an unknown audio file and for correlating the audio file to a unique audio ID used to retrieve metadata.

FIG. 2 illustrates a system for creating a fingerprint from an unknown audio file 220 and for correlating it to a unique audio ID used to retrieve metadata. The fingerprint is generated using a fingerprint creation module 120 which analyzes the unknown audio recording 220 in the same manner as the fingerprint creation module 120 described above with respect to FIG. 1. In the embodiment shown, the query on the fingerprint takes place on a server 200 using a recognition engine 210 that calculates one or more derivatives of the fingerprint and then attempts to match each derivative to one or more fingerprints stored in the fingerprint library data structure 100. The initial search is an "optimistic" approach because the system is optimistic that the one of the derivatives will be identical to or very similar to one of the feature groups, thereby reducing the number of (server) fingerprints queried in search of a match.

If the optimistic approach fails, then a "pessimistic" approach attempts to match the received fingerprint to those stored in the server database one at a time using heuristic and conventional search techniques.

Once the fingerprint is matched the audio recording's corresponding unique ID is used to correlate metadata stored on a database. A preferred embodiment of this matching approach is described below with reference to FIG. 6.

Figure 3:
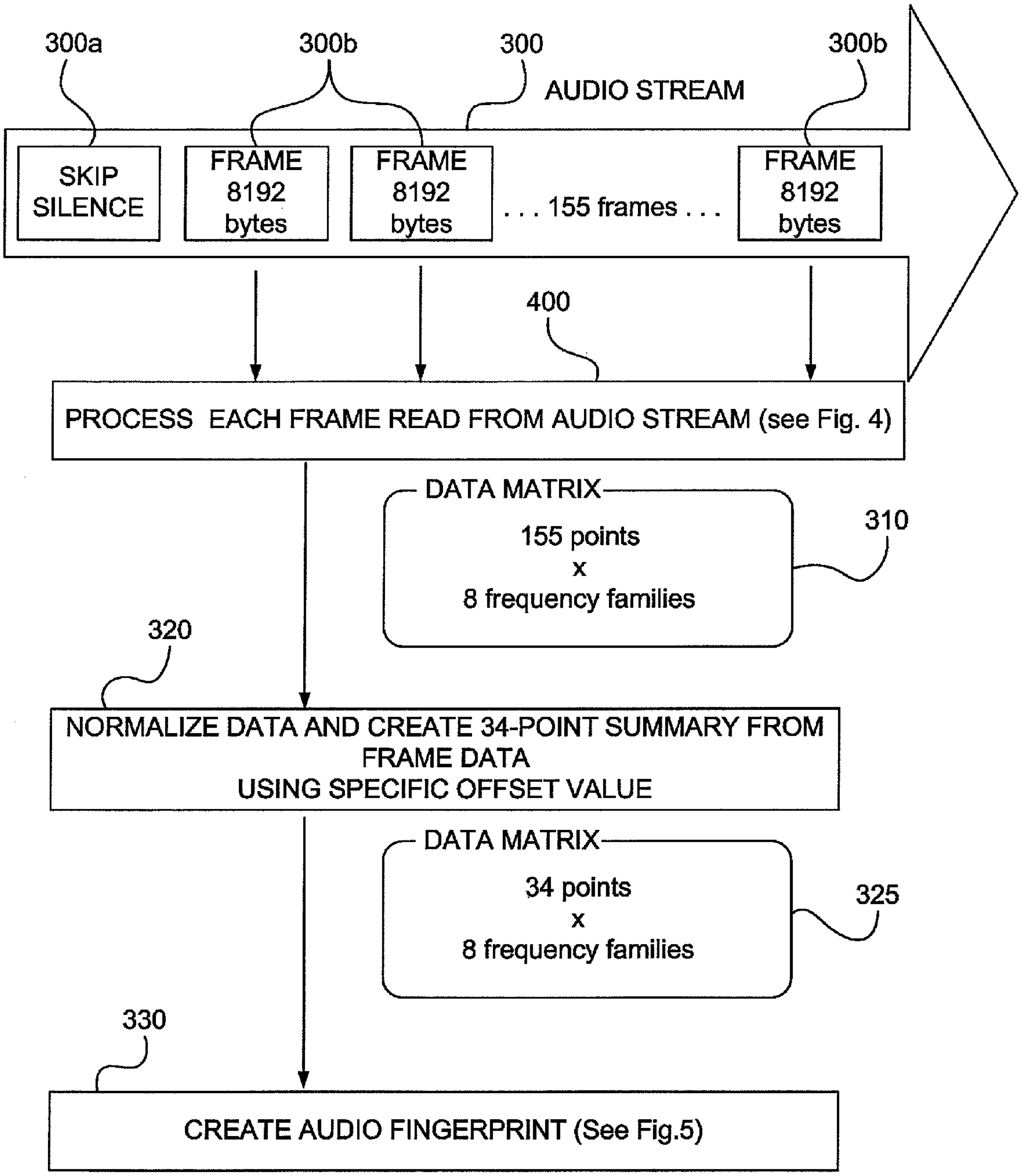
FIG. 3 is a flow diagram illustrating how a fingerprint is generated from a multi-frame audio stream.

FIG. 3 is a flow diagram illustrating how a fingerprint is generated from a multi-frame audio stream 300. A frame in the context of the present invention is a predetermined size of audio data.

Only a portion of the audio stream is used to generate the fingerprint. In the embodiment described herein only 155 frames are analyzed, where each frame has 8192 bytes of data. This embodiment performs the fingerprinting algorithm of the present invention on encoded or compressed audio data which has been converted into a stereo PCM audio stream.

PCM is typically the format into which most consumer electronics products internally uncompress audio data. The present invention can be performed on any type of audio data file or stream, and therefore is not limited to operations on PCM formatted audio streams. Accordingly, any reference to specific memory sizes, number of frames, sampling rates, time, and the like are merely for illustration.

Silence is very common at the beginning of audio tracks and can potentially lower the quality of the audio recognition. Therefore the present invention skips silence at the beginning of the audio stream 300, as illustrated in step 300*a*. Silence need not be absolute silence. For example, low amplitude audio can be skipped until the average amplitude level is greater than a percentage (e.g., 1-2%) of the maximum possible and/or present volume for a predetermined time (e.g., 2-3 second period). Another way to skip silence at the beginning of the audio stream is simply to do just that, skip the beginning of the audio stream for a predetermined amount of time (e.g., 10-12 seconds).

Next, each frame of the audio data is read into a memory and processed, as shown in step 400. In the embodiment described herein, each frame size represents roughly 0.18 seconds of standard stereo PCM audio. If other standards are used, the frame size can be adjusted accordingly. Step 400, which is described in more detail with reference to FIG. 4, processes each frame of the audio stream.

Figure 4:
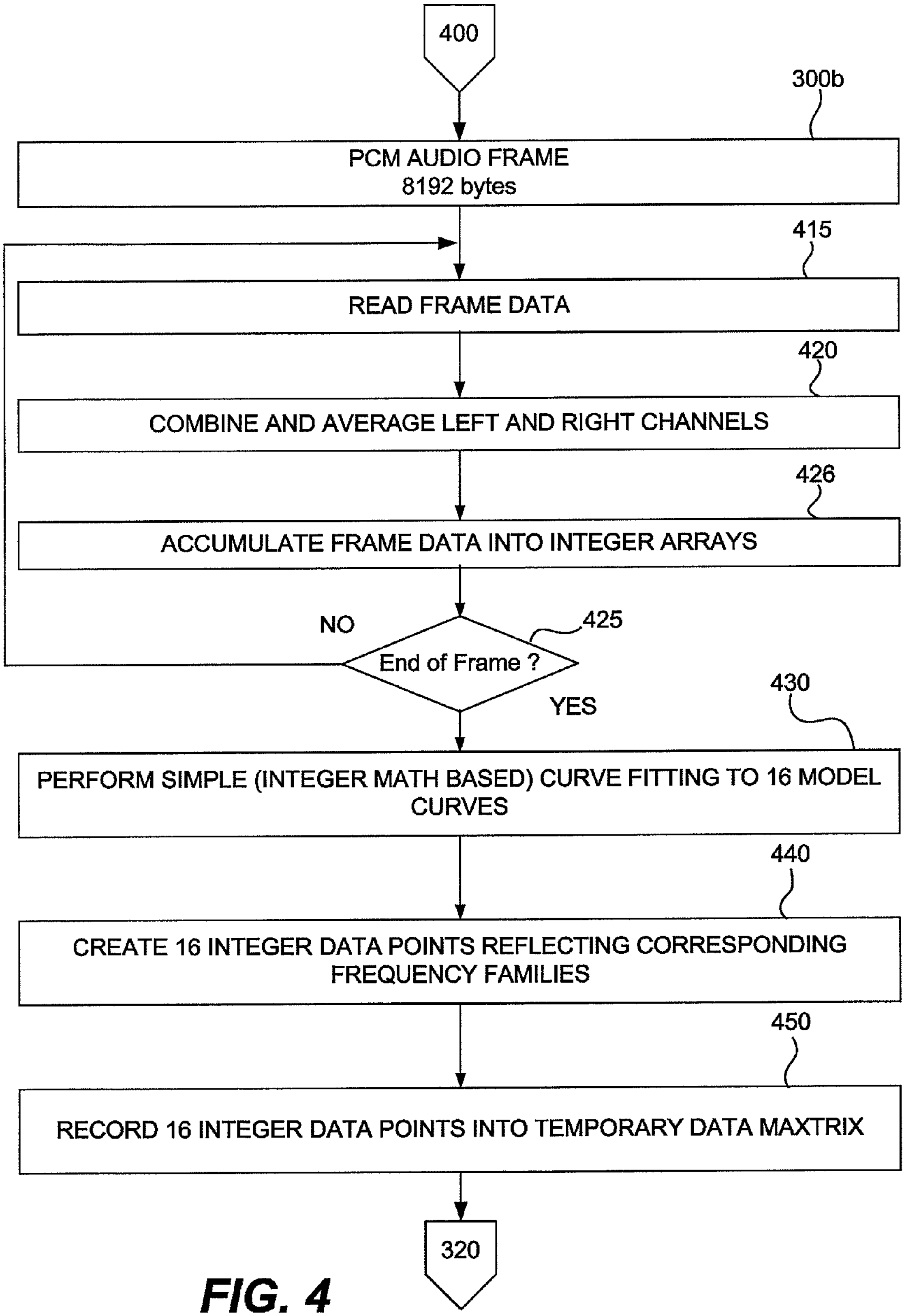
FIG. 4 illustrates the process performed on an audio frame object.

FIG. 4 illustrates the process performed on each audio frame object 300*b*. At step 415, the frame is read. As each sampling point is read, in step 420, left and right channels are combined by summing and averaging the left and right channel data corresponding to each sampling point. For example, in the case of standard PCM audio, each sampling point will occupy four bytes (i.e., two bytes for each channel). Other well-known forms of combining audio channels can be used and still be within the scope of this invention. Alternatively, only one of the channels can be used for the following analysis. This process is repeated until the entire frame has been read, as show in step 425.

At step 426, data points are stored sequentially into integer arrays corresponding to the predefined number of frequency families. More particularly, each array has a length of a full cycle of one of the predefined frequencies (i.e., stable frequencies) which, as explained above, also corresponds to a family of frequencies. Since a full wavelength can be equated to a given number of points, each array will have a different size. In other words, an array of x points corresponds to a full wave having x points, and an array of y points corresponds to a full wave having y points. The incoming stream of points are accumulated into the arrays by placing the first incoming data point into the first location of each array, the second incoming data point is placed into the second location in each array, and so on. When the end of an array is reached, the next point is added to the first location in that array. Thus, the contents of the arrays are synchronized from the first point, but will eventually differ since each array has a different length (i.e., represents a different wavelength).

After a full frame is processed, at step 430 each one of the accumulated arrays is curve fitted (i.e., compared) to the "model" array of the perfect sine curve for the same stable frequency. To compensate for any potential phase differential, the array being compared is cyclically shifted N times, where N represents the number of points in the array, and then summed with the model array to find the best fit which represents the level of "resonance" between the audio and the model frequency. This allows the strength of the family of frequencies harmonically related to a given frequency to be estimated.

Referring again to FIG. 3, the last step in the frame processing is combining pairs of frequency families, as shown in step 310. This step reduces the number of frequency families by adding the first array with the second, the third with the fourth, and so on. For example, if the predetermined number of rows in the matrix is 16, then the 16 rows are reduced to 8. In other words, if 155 frames are processed, then each new array includes two of the original sixteen families of frequencies yielding a 155×8 matrix of integer numbers from 155 processed frames, where now there are 8 compound frequency families.

Sometimes there are spikes in the audio data (e.g., pops and clicks), which are artifacts. Trimming a percentage (e.g., 5%-10%) of the highest values to the maximum level can improve the overall performance of algorithm by allowing the most variation (i.e., the most significant range) of the audio content. This is accomplished in Step 320 by normalizing the 155×8 matrix to fit into a predetermined range of values (e.g., 0 . . . 255).

The audio data may be slightly shifted in time due to the way it is read and/or digitized. That is, the recording may start playback a little earlier or later due to the shift of the audio recording. For example, each time a vinyl LP is played the needle transducer may be placed by the user in a different location from one playback to the next. Thus, the audio recording may not start at the same location, which in effect shifts the LP's start time. Similarly, CD players may also shift the audio content differently due to difference in track-gap playback algorithms. Before the fingerprint is created, another summary matrix is created including a subset of the original 155×8 matrix, shown at step 325. This step smoothes the frequency patterns and allows fingerprints to be slightly time-shifted, which improves recognition of time altered audio. The frequency patterns are smoothed by summing the initial 155×8 matrix. To account for potential time shifts in the audio, a subset of the resulting summation is used, leaving room for time shifts. The subset is referred to as a summary matrix.

In the embodiment described herein, the resulting summary matrix has 34 points, each representing the sum of 3 points from the initial matrix. Thus, the summary matrix includes 34×3=102 points allowing for 53 points of movement to account for time shifts caused by different playback devices and/or physical media on which audio content is stored (e.g., +/−2.5 seconds). In practice, the shifting operations need not be point by point and may be multiples thereof. Thus, only a small number of data points from the initial 155×8 matrix are used to create each time-shifted fingerprint, which can improve the speed it takes to analyze time-shifted audio data.

Figure 5:
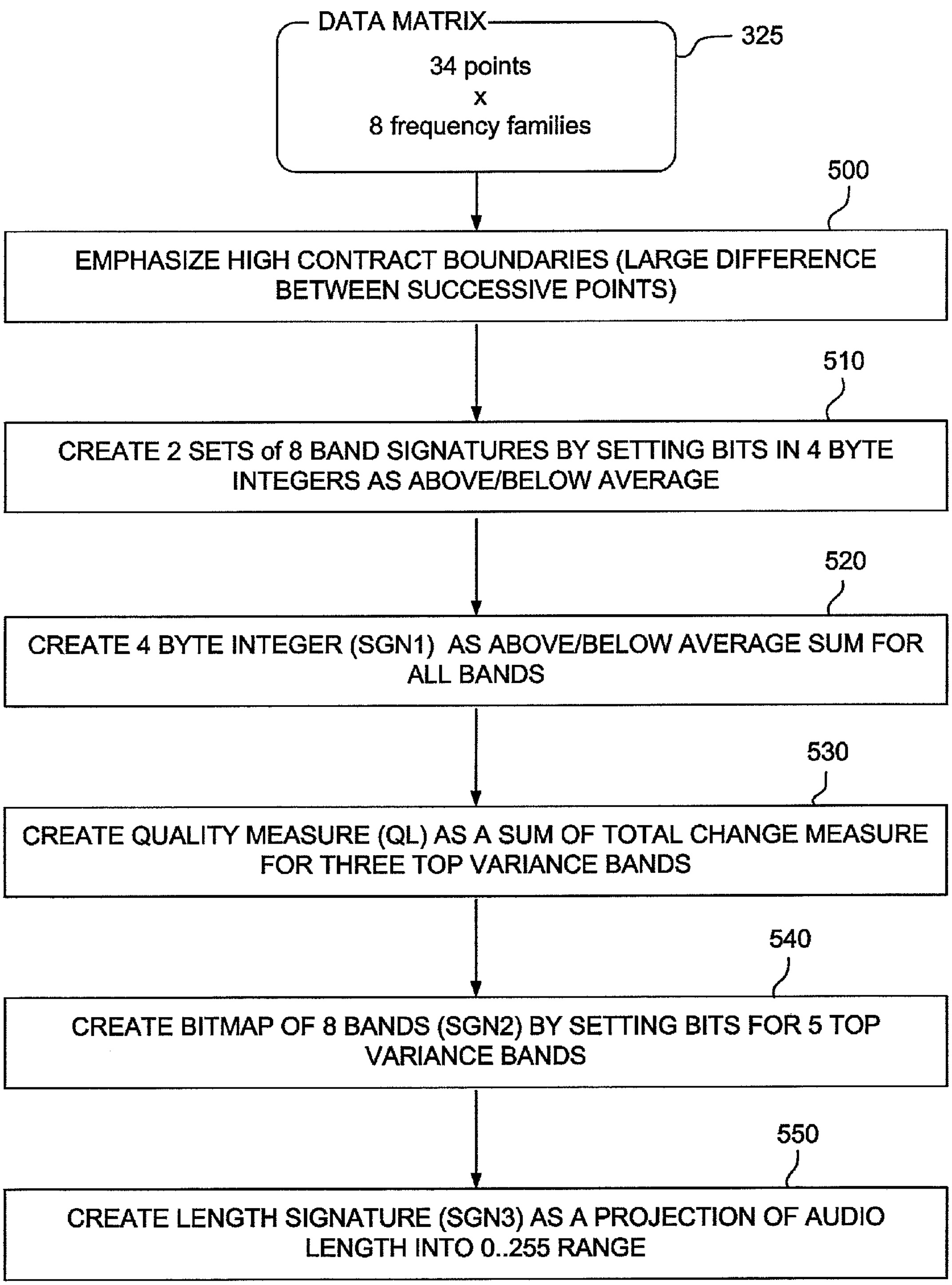
FIG. 5 is a flowchart illustrating the final steps for creating a fingerprint.

FIG. 5 is a flowchart illustrating the final steps for creating a fingerprint. Various analyses are performed on the 34×8 matrix object 325 created in FIG. 3. In step 500, the 34×8 summary matrix is analyzed to determine the extent of any differences between successive values within each one of the compound frequency families. First, the delta of each pair of successive points within one compound frequency family is determined. Next, the value of each element of the 34×8 matrix is increased by double the delta with right and left neighboring elements within the 34 points, thus rewarding the element with high "contrast" to its neighbors (e.g., an abrupt change in amplitude level).

Step 510 determines, for each point in the 34×8 matrix, which frequencies are predominant (e.g., frequency with highest amplitude) or with very little presence. First, two 8 member arrays are created, where each member of an array is a 4 byte integer. For the first 32 points of each row of the 34×8 summary matrix, a bit in one of the newly created arrays (SGN) is set to "on" (i.e., a bit is set to one) if a value in the row of the summary matrix exceeds the average of the entire matrix plus a fraction of its standard deviation. For each of the first 32 points in the 34×8 summary matrix that is below the average of the entire matrix minus a fraction of its standard deviation a corresponding bit in the second newly created array (SGN_) is set to "on." The result of this procedure is the two 8 member arrays indicating the distributional values of the original integer matrix, thereby reducing the amount of information necessary to indicate which frequencies are predominant or not present, which in turn helps make processing more efficient.

In step 520, the 8 frequency families are summed together resulting in one 32 point array. From this array, the average and deviation can be calculated and a determination made as to which points exceed the average plus its deviation. For each point in the 32 point array that exceeds the average plus a fraction of the standard deviation, a corresponding bit in another 4-byte integer (SGN1) is set "on."

Some types of music have very little, if any, variation within a particular span within the audio stream (e.g., within 34 points of audio data). In step 530, a measurement of the quality or "quality measurement factor" (QL) for the fingerprint is defined as the sum of the total variation of the 3 highest variation frequency families. Stated differently, the sum of all differences for each one of the eight combined frequency families results in 8 values representing a total change within a given frequency family. The 3 highest values of the 8 values are those with the most overall change. When added together, the 3 highest values become the QL factor. The QL factor is thus a measurement of the overall variation of the audio as it relates to the model frequency families. If there is not enough variation, the fingerprint may not be distinctive enough to generate a unique fingerprint, and therefore, may not be sufficient for the audio recognition. The QL factor is thus used to determine if another set of 155 frames from the audio stream should be read and another fingerprint created.

In step 540, a 1 byte integer (SGN2) is created. This value is a bitmap where 5 of its bits correspond to the 5 frequency families with the highest level of variation. The bits corresponding to the frequency families with the highest variation are set on. The variation determination for step 540 and step 530 are the same. For example, the variation can be defined as the sum of differences between values across all of the (time) points. The total of the differences is the variation.

Finally, in step 550, a 1 byte integer value (SGN3) is created to store the translation of the total running time of the audio file (if known) to the 0 . . . 255 integer. This translation can take into account the actual running time distribution of the audio content. For example, popular songs typically average in time from 2.5 to 4 minutes. Therefore the majority of the 0 . . . 255 range should be allocated to these times. The distribution could be quite different for classical music or for spoken word.

One audio file can potentially have multiple fingerprints associated with it. This might be necessary if the initial QL value is low. The fingerprint creation program continues to read the audio stream and create additional fingerprints until the QL value reaches an acceptable level.

Once the fingerprints have been created for all the available audio files they can be put into the fingerprint library which includes a data structure optimized for the recognition process. As a first step the fingerprints are clustered into 255 clusters based on the SGN and SGN_ values (i.e., the two integer arrays discussed above with respect to step 510 in FIG. 5). The center point of each cluster is written to the library. Then the whole set of fingerprints is ordered by SGN2 which corresponds to the five frequency families with the highest level of variation.

All fingerprints are written into the library as binary data in an order based on SGN2. As discussed above, SGN and SGN_ represent the most predominant and least present frequencies, respectively. Out of 8 frequency families there are five frequency bands that exhibit the highest level of variation, which are denoted by the bits set in SGN2. Instead of storing 8 integers from each of the SGN and SGN_ arrays, only 5 each are written based of the bits set in SGN2 (i.e., those corresponding to the highest variation frequency families). Advantageously, this saves storage space since the 3 frequency families with the lowest variation are much less likely to contribute to the recognition.

The variation data that remain have the most information. The record in the database is as follows: 1 byte for SGN2, 1 Byte for cluster number, 4 bytes for SGN1, 20 bytes for 5 SGN numbers, 20 bytes for 5 SGN_ numbers, 3 bytes for the audio ID, and 1 byte for SGN3. The size of each fingerprint is thus 50 bytes.

Figure 6:
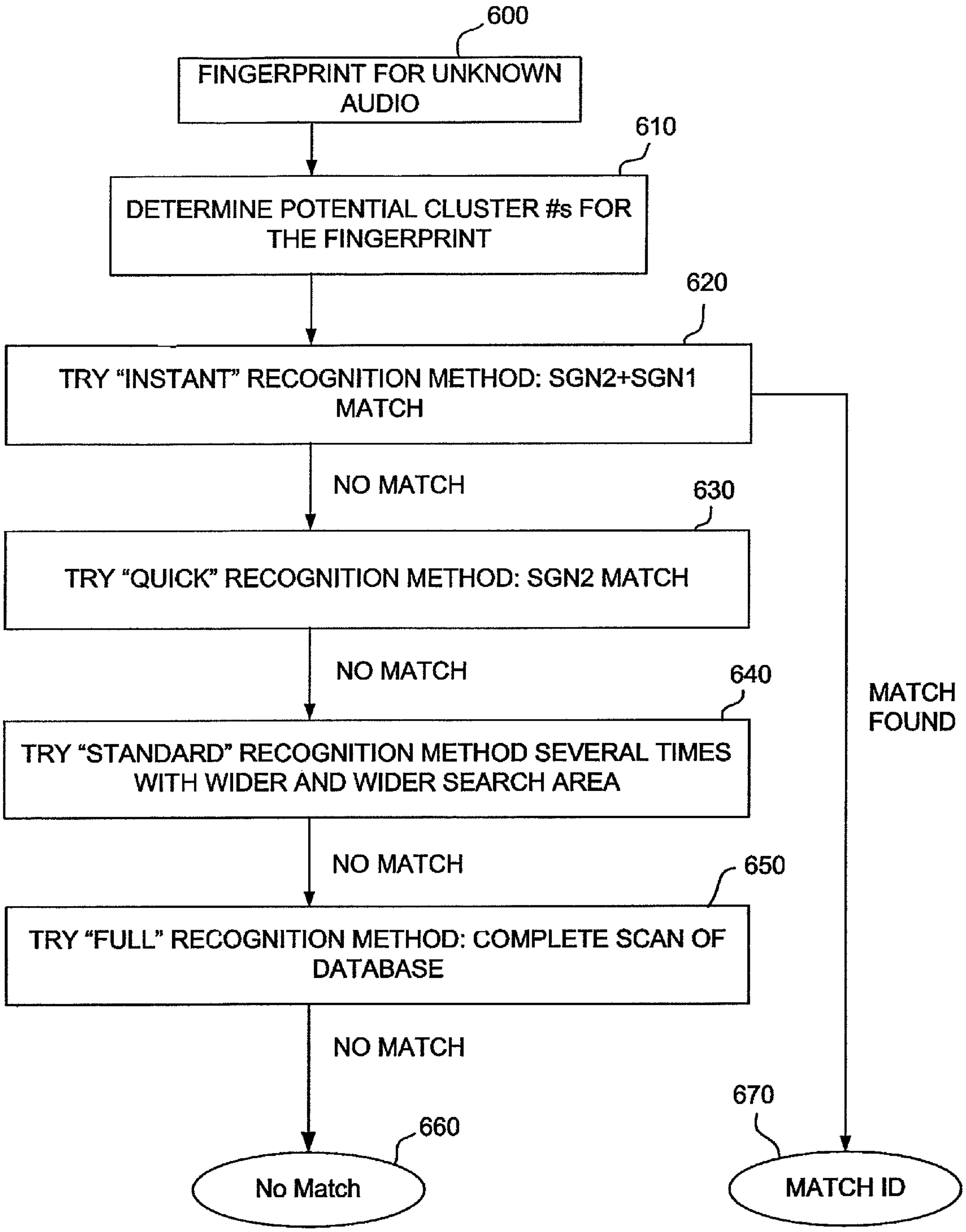
FIG. 6 is an audio file recognition engine for matching the unknown audio fingerprint to known fingerprint data stored in a fingerprint library data structure.

FIG. 6 is an audio file recognition engine for matching the unknown audio fingerprint to known fingerprint data stored in the fingerprint library data structure. As discussed above, the fingerprint for the unknown audio file is created the same way as for the fingerprint library and passed on to the recognition engine. First, the recognition engine determines any potential clusters the fingerprint could fall into by matching its SGN and SGN_ values against 255 cluster center points, as shown is 610.

In step 620, the recognition engine attempts to recognize the audio in a series of data scans starting with the most direct and therefore the most immediate match cases. The "instant" method assumes that SGN1 matches precisely and SGN2 matches with only a minor difference (e.g., a one bit variation). If the "instant" method does not yield a match, then a "quick" method is invoked in step 630 which allows a difference (e.g., up to a 2 bit variation) on SGN2 and no direct matches on SGN1.

If still no match is found, in step 640 a "standard" scan is used, which may or may not match SGN2, but uses SGN2, SGN1 and potential fingerprint cluster numbers as a quick heuristic to reject a large number of records as a potential match. If still no match is found in step 650 a "full" scan of the database is evoked as the last resort.

Each method keeps a running list of the best matches and the corresponding match levels. If the purpose of recognition is to return a single ID, the process can be interrupted at any point once an acceptable level of match is reached, thus allowing for very fast and efficient recognition. If on the other hand, all possible matches need to be returned, the "standard" and "full" scan should be used.

Figure 7:
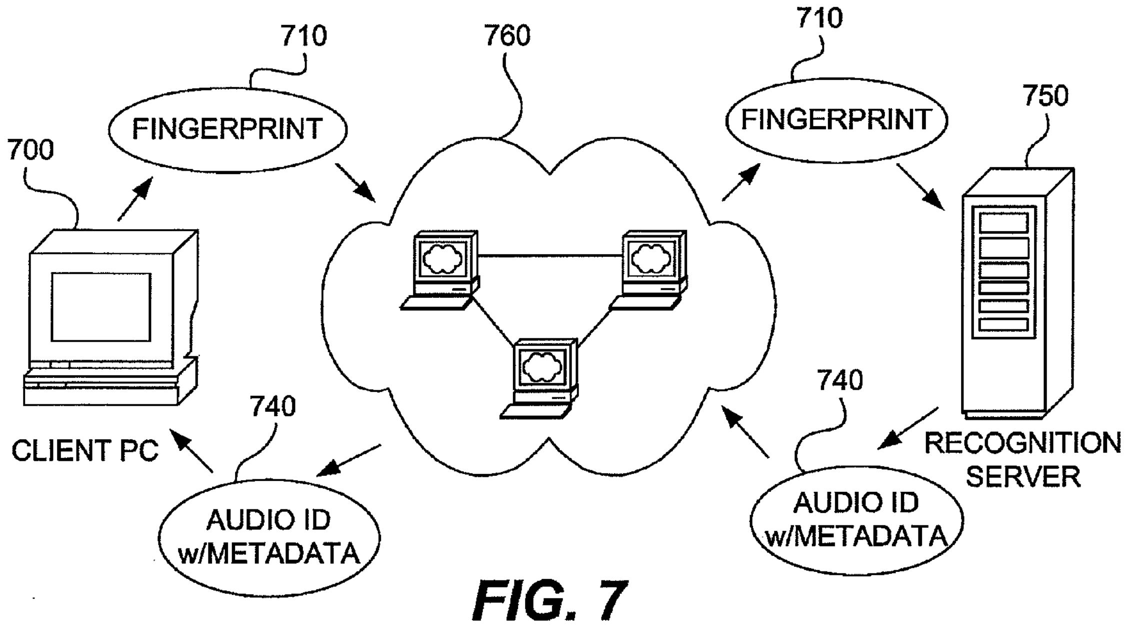
FIG. 7 illustrates a client-server based system for creating a fingerprint from an unknown audio file and for retrieving metadata in accordance with the present invention.

FIG. 7 illustrates a client-server based system for creating a fingerprint from an unknown audio file and for retrieving metadata in accordance with the present invention. The client PC 700 may be any computer connected to a network 760.

The exchange of information between a client and a recognition server 750 include returning a web page with metadata based on a fingerprint. The exchange can be automatic, triggered for example when an audio recording is uploaded onto a computer (or a CD placed into a CD player), a fingerprint is automatically generated using a fingerprint creation module (not shown), which analyzes the unknown audio recording in the same manner as described above. After the fingerprint creation engine generates a fingerprint 710, the client PC 700 transmits the fingerprint onto the network 760 to a recognition server 750, which for example may be a Web server. Alternatively, the fingerprint creation and recognition process can be triggered manually, for instance by a user selecting a menu option on a computer which instructs the creation and recognition process to begin.

The network can be any type of connection between any two or more computers, which permits the transmission of data. An example of a network, although it is by no means the only example, is the Internet.

A query on the fingerprint takes place on a recognition server 750 by calculating one or more derivatives of the fingerprint and matching each derivative to one or more fingerprints stored in a fingerprint library data structure. Upon recognition of the fingerprint, the recognition server 750 transmits audio identification and metadata via the network 760 to the client PC 700. Internet protocols may be used to return data to the application which runs the client, which for example may be implemented in a web browser, such as Internet Explorer, Mozilla or Netscape Navigator, or on a proprietary media viewer.

Alternatively, the invention may be implemented without client-server architecture and/or without a network. Instead, all software and data necessary for the practice of the present invention may be stored on a storage device associated with the computer (also referred to as a device-embedded system). In a most preferred embodiment the computer is an embedded media player. For example, the device may use a CD/DVD drive, hard drive, or memory to playback audio recordings. Since the present invention uses simple arithmetic operations to perform audio analysis and fingerprint creation, the device's computing capabilities can be quite modest and the bulk of the device's storage space can be utilized more effectively for storing more audio recordings and corresponding metadata.

Figure 8:
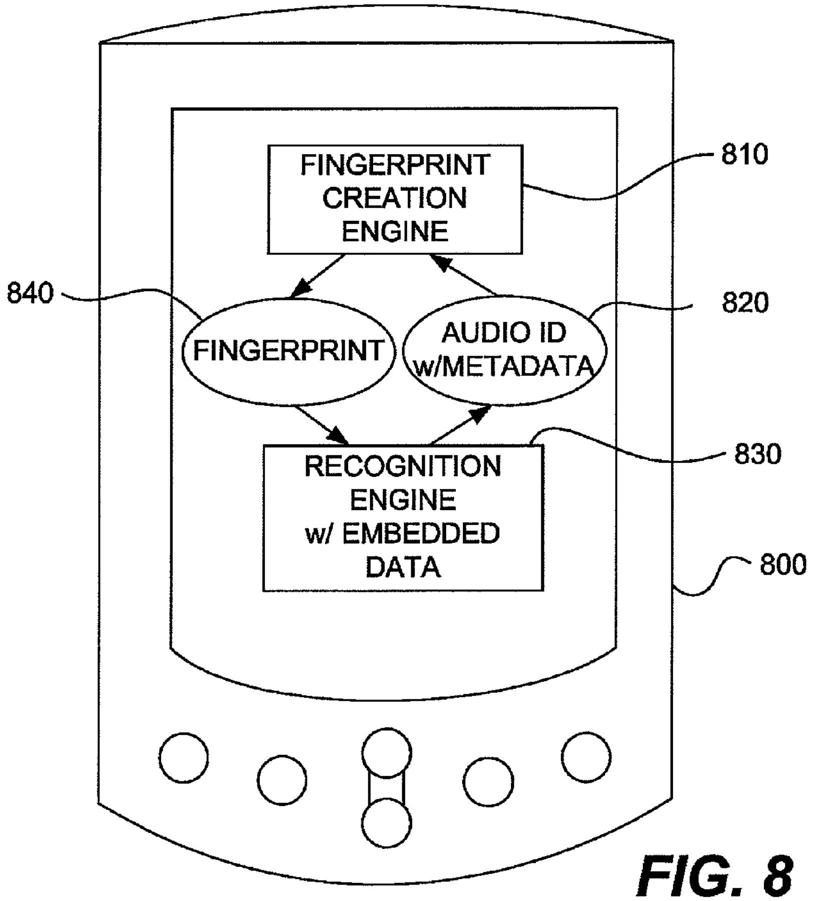
FIG. 8 is device-embedded system for delivering supplemental entertainment content in accordance with the present invention.

As illustrated in FIG. 8, a recognition engine 830 may be installed onto the device 800, which includes embedded data stored on a CD drive, hard drive, or in memory. The embedded data may contain a complete set or a subset of the information available in the databases on a recognition server 750 such as the one described above with respect to FIG. 7. Updated databases may be loaded onto the device using well known techniques for data transfer (e.g., FTP protocol). Thus, instead of connecting to a remote database server each time fingerprint recognition is sought, databases may be downloaded and updated occasionally from a remote host via a network. The databases may be downloaded from a Web site via the Internet through a WI-FI, WAP or BlueTooth connection, or by docking the device to a PC and synchronizing it with a remote server.

More particularly, after the fingerprint creation engine 810 generates a fingerprint 840, the device 800 internally communicates the fingerprint 840 to an internal recognition engine 830 which includes a library for storing metadata and audio recording identifiers (IDs). The recognition engine 830 recognizes a match, and communicates an audio ID and metadata corresponding to the audio recording. Other variations exist as well.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus for generating an audio fingerprint, comprising:

a processor operable to:

extract a plurality of frequencies from two or more audio source files included in a set of audio source files, wherein the two or more audio source files are encoded in different formats;

measure, across the two or more audio source files, a range of variation of each of the plurality of frequencies, the range of variation of a respective frequency being a range of variation of values for the frequency measured from among the two or more audio source files;

for each of the plurality of frequencies, compare the range of variation to a corresponding threshold to determine whether the range of variation is less than the corresponding threshold;

identify a plurality of stable frequencies from among the plurality of frequencies extracted from two or more audio source files, an extracted frequency being identified as a stable frequency if the respective range of variation is determined to be less than the corresponding threshold;

identify harmonically related stable frequencies from among the identified plurality of stable frequencies, each group of harmonically related stable frequencies forming a stable frequency family;

map sample points of an unknown recording to at least a portion of at least one stable frequency family;

generate fingerprint data by analyzing the mapped sample points of the unknown recording; and form the audio fingerprint from the generated fingerprint data.

2. The apparatus according to claim 1, wherein the plurality of stable frequencies include at least one set of harmonically related frequencies and the processor is further operable to select a representative frequency of each set of harmonically related frequencies to form the stable frequency family.

3. The apparatus according to claim 1, wherein two or more of the audio source files are recorded on different physical media.

4. The apparatus according to claim 1, wherein the range is an audio amplitude range.

5. The apparatus according to claim 1, wherein the processor is further operable to assign a unique identifier to each of the audio source files and associate the audio fingerprint to a corresponding unique identifier.

6. The apparatus according to claim 4, further comprising:

a database operable to store metadata associated with the unique identifier; and a user interface, in communication with the database, operable to present the metadata.

7. A method for generating an audio fingerprint, comprising:

extracting, using an audio processor, a plurality of frequencies from two or more audio source files include in a set of audio source files, wherein the two or more audio source files are encoded in different formats;

measuring, across the two or more audio source files, a range of variation of each of the plurality of frequencies, the range of variation of a respective frequency being a range of variation of values for the frequency measured from among the two or more audio source files;

for each of the plurality of frequencies, comparing the range to a corresponding threshold to determine whether the range of variation is less than the corresponding threshold;

identifying a plurality of stable frequencies from among the plurality of frequencies extracted from two or more audio source files, an extracted frequency being identified as a stable frequency if the respective range of variation is determined to be less than the corresponding threshold;

identifying harmonically related stable frequencies from among the identified plurality of stable frequencies, each group of harmonically related stable frequencies forming a stable frequency family;

mapping sample points of an unknown recording to at least a portion of at least one stable frequency family;

generating fingerprint data by analyzing the mapped sample points of the unknown recording; and forming the audio fingerprint from the generated fingerprint data.

8. The method according to claim 7, wherein the plurality of stable frequencies include at least one set of harmonically related frequencies, the method further comprising:

selecting a representative frequency of each set of harmonically related frequencies to form the stable frequency family.

9. The method according to claim 7, wherein two or more of the audio source files are recorded on different physical media.

10. The method according to claim 7, wherein the range is an audio amplitude range.

11. The method according to claim 7, further comprising:

assigning a unique identifier to each of the audio source files; and associating the audio fingerprint to a corresponding unique identifier.

12. The method according to claim 11, further comprising:

storing metadata associated with the unique identifier; and presenting the metadata on a user interface.

13. A non-transitory computer-readable medium having stored thereon sequences of instructions, the sequences of instructions including instructions which when executed by a computer system causes the computer system to perform:

extracting, using an audio processor, a plurality of frequencies from two or more audio source files included in a set of audio source files, wherein the two or more of the audio source files are encoded in different formats;

measuring, across the two or more audio source files, a range of variation of each of the plurality of frequencies, the range of variation of a respective frequency being a range of variation of values for the frequency measured from among the two or more audio source files;

for each of the plurality of frequencies, comparing the range of variation to a corresponding threshold to determine whether the range of variation is less than the corresponding threshold identifying a plurality of stable frequencies from among the plurality of frequencies extracted from two or more audio source files, an extracted frequency being identified as a stable frequency if the respective range of variation is determined to be less than the corresponding threshold;

identifying harmonically related stable frequencies from among the identified plurality of stable frequencies, each group of harmonically related stable frequencies forming a stable frequency family;

mapping sample points of an unknown recording to at least a portion of at least one stable frequency family generating fingerprint data by analyzing the mapped sample points of the unknown recording; and forming the audio fingerprint from the generated fingerprint data.

14. The non-transitory computer-readable medium of claim 13, further storing a sequence of instructions which when executed by a computer system causes the computer system to perform:

selecting a representative frequency of each set of harmonically related frequencies to form the stable frequency family, wherein the plurality of stable frequencies include at least one set of harmonically related frequencies.

15. The non-transitory computer-readable medium of claim 13, wherein two or more of the audio source files are recorded on different physical media.

16. The non-transitory computer-readable medium of claim 13, wherein the range is an audio amplitude range.

17. The non-transitory computer-readable medium of claim 13, further storing a sequence of instructions which when executed by a computer system causes the computer system to perform:

assigning a unique identifier to each of the audio source files; and associating the audio fingerprint to a corresponding unique identifier.

18. The non-transitory computer-readable medium of claim 17, further storing a sequence of instructions which when executed by the computer system causes the computer system to perform:

storing metadata associated with the unique identifier; and presenting the metadata on a user interface.

19. The apparatus according to claim 1, wherein the two or more audio source files included in the set of audio source files are encodings of a same audio recording, and wherein each range of variation represents a variation of the respective frequency measured from among the two or more audio source files of the same audio recording.

20. The method according to claim 7, wherein the two or more audio source files included in the set of audio source files are encodings of a same audio recording, and wherein each range of variation represents a variation of the respective frequency measured from among the two or more audio source files of the same audio recording.

* * * * *